A. TURNBULL.

Improvement in Bed-Bottoms.

No. 5,591. Reissued Oct. 7, 1873.

Witnesses.

J. H. Shumway

A. J. Tibbits

Andrew Turnbull
Inventor
By Attyf.

Thos. E. Earle

AM. PHOTO-LITHOGRAPHIC Co. N.Y. (OSBORNE'S PROCESS)

UNITED STATES PATENT OFFICE.

ANDREW TURNBULL, OF NEW BRITAIN, CONNECTICUT.

IMPROVEMENT IN BED-BOTTOMS.

Specification forming part of Letters Patent No. 128,438, dated June 25, 1872; reissue No 5,591, dated October 7, 1873; application filed June 6, 1873.

*To all whom it may concern:*

Be it known that I, ANDREW TURNBULL, of New Britain, in the county of Hartford and State of Connecticut, have invented a new Improvement in Bed-Bottoms; and I do hereby declare the following, when taken in connection with the accompanying drawings and the letters of reference marked thereon, to be a full, clear, and exact description of the same, and which said drawings constitute part of this specification, and represent, in—

Figure 2:
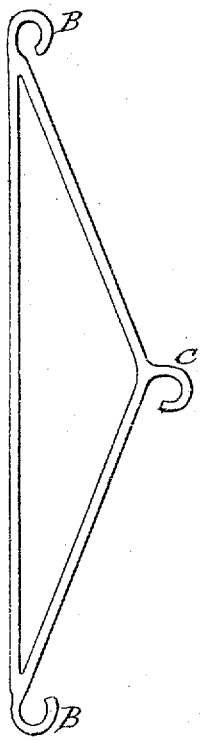
Figure 1:
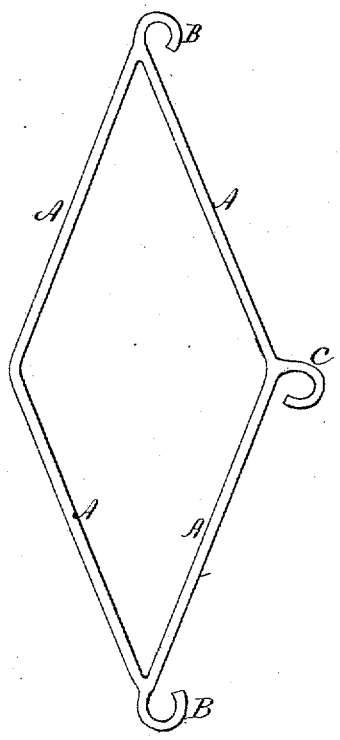
Figure 3:
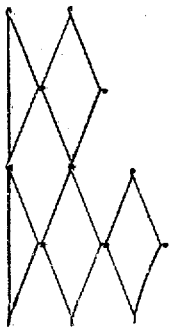

Figure 1, a top view of a full piece, Fig. 2 a top view of a half piece, as they come from the flask; and in Fig. 3, the manner of uniting the parts to form the bed-bottom.

This invention relates to an improvement in the construction of the bed-bottom for which Letters Patent were granted to Rodolphus L. Webb and myself, bearing date April 9, 1872. In that patent the bed-bottom was formed by links extending from one ring to another, and were made from wire. The object of this invention is to reduce the cost by combining one set or four links and their rings in one and the same piece; and the invention consists, first, in constructing a link, which forms a component part of the bed-bottom, endless and from a single piece of metal; second, in a bed-bottom composed of a succession of links, each joined to the next longitudinal and transverse link by a rigid or non-elastic connection.

In carrying out my invention, I make the links, by preference, of a diamond form, as seen in Fig. 1, and this is best done from cast metal; and, as a means of connection with the next transverse link, I form a hook, C, upon one side, and with a similar hook, B, at the ends for connection to the next link longitudinally. This affords a cheap manner of connection. These links, which form the component part of the bed-bottom, are attached to each other longitudinally and transversely by inelastic connections, as seen in Fig. 3, forming together the net-work of the bed-bottom. For the edges I prefer to make a triangular link, as seen in Fig. 2, uniting with the others, as seen in Fig. 3, which makes the edge of the net-work straight.

It is not essential that a hook be formed upon each end, as the hook of one end may take into the end of the next section in like manner as described for the side; also, if preferred, a hook may be formed upon each side, instead of one side, as described; but, preferably, the hooks are formed as a part of the link.

I am aware of the structure shown in the patent granted to E. Adler, December 23, 1856, in which a series of metal caps resting upon springs beneath, and connected together and to the frame by links, is seen; but I do not wish to be understood as claiming anything found in said patent.

I claim as my invention—

1. As a component part of a bed-bottom, a diamond-shaped link made of one piece, and provided with means of connection to the next adjacent link, substantially as described.

2. A bed-bottom composed of a succession of diamond-shaped links, each joined to the next longitudinal and transverse links by a rigid or non-elastic connection at the angles of the said links, substantially as described.

ANDREW TURNBULL.

Witnesses;

JULIUS H. PEASE,

RODOLPHUS L. WEBB.